(12) United States Patent
Brunetti

(10) Patent No.: US 12,299,975 B2
(45) Date of Patent: May 13, 2025

(54) SYSTEMS AND METHODS FOR MAPPING PROJECT SITES USING GROUND AND AERIAL IMAGERY

(71) Applicant: Anthony M. Brunetti, Yorba Linda, CA (US)

(72) Inventor: Anthony M. Brunetti, Yorba Linda, CA (US)

( * ) Notice: Subject to any disclaimer, the term of this patent is extended or adjusted under 35 U.S.C. 154(b) by 0 days.

(21) Appl. No.: 18/417,991

(22) Filed: Jan. 19, 2024

(65) Prior Publication Data

US 2024/0395031 A1     Nov. 28, 2024

Related U.S. Application Data

(63) Continuation of application No. 18/296,864, filed on Apr. 6, 2023, now Pat. No. 11,887,364.
(Continued)

(51) Int. Cl.
*G06V 20/10* (2022.01)
*G01C 21/00* (2006.01)
(Continued)

(52) U.S. Cl.
CPC ......... *G06V 20/176* (2022.01); *G01C 21/387* (2020.08); *G06F 16/909* (2019.01);
(Continued)

(58) Field of Classification Search
None
See application file for complete search history.

(56) References Cited

U.S. PATENT DOCUMENTS

| 5,414,462 | A  | 5/1995 | Veatch |
| 7,728,833 | B2 | 6/2010 | Verma et al. |

(Continued)

FOREIGN PATENT DOCUMENTS

| CA | 2815998 C  | 9/2016 |
| JP | 06187958 B2 | 8/2017 |

(Continued)

OTHER PUBLICATIONS

Dhonju HK, Walsh KB, Bhattarai T. Web mapping for farm management information systems: A review and Australian orchard case study. Agronomy. Oct. 5, 2023;13(10):2563. (Year: 2023).*

(Continued)

*Primary Examiner* — Emily C Terrell
*Assistant Examiner* — Nathan J Bloom
(74) *Attorney, Agent, or Firm* — Knobbe Martens Olson & Bear LLP

(57) ABSTRACT

The systems and methods described herein provide improvements to mapping project sites by using ground and/or aerial imagery. A system can receive one or more ground images of site locations within a site area and metadata associated with each of the one or more ground images. The metadata can include GPS coordinates that correspond to the one or more ground images. The system can determine that aerial imagery represents at least the one or more site locations and determine a relative position of each of the one or more site locations within the aerial imagery. Such a determination may be based on the metadata (e.g., on the GPS coordinates). The system can then generate data to display on a user interface one or more features, such as a map, an indication of the site area, and one or more indicators.

15 Claims, 9 Drawing Sheets

Related U.S. Application Data

(60) Provisional application No. 63/362,658, filed on Apr. 7, 2022.

(51) Int. Cl.
  *G06F 16/909* (2019.01)
  *G06T 7/70* (2017.01)
  *G06V 10/10* (2022.01)
  *G09B 29/10* (2006.01)

(52) U.S. Cl.
  CPC ............... *G06T 7/70* (2017.01); *G06V 10/17* (2022.01); *G09B 29/106* (2013.01); *G06T 2207/10032* (2013.01); *G06T 2207/20092* (2013.01); *G06T 2207/30184* (2013.01)

(56) References Cited

U.S. PATENT DOCUMENTS

| | | | |
|---|---|---|---|
| 8,731,813 | B2 | 5/2014 | Sheha et al. |
| 8,954,860 | B1 | 2/2015 | Hands et al. |
| 9,135,737 | B2 | 9/2015 | Pershing |
| 9,279,602 | B2 | 3/2016 | Kennedy et al. |
| 9,442,911 | B2 | 9/2016 | Hagiwara et al. |
| 9,460,175 | B1 | 10/2016 | Hong |
| 10,570,588 | B1 | 2/2020 | Elkins |
| 10,648,800 | B2 | 5/2020 | Thornberry et al. |
| 10,663,294 | B2 | 5/2020 | Pershing et al. |
| 2006/0074738 | A1 | 4/2006 | Vanhoose et al. |
| 2010/0010882 | A1 | 1/2010 | Nielsen et al. |
| 2011/0046881 | A1 | 2/2011 | Karaoguz |
| 2014/0114931 | A1 | 4/2014 | Cline et al. |
| 2015/0067032 | A1 | 3/2015 | Djabarov et al. |
| 2016/0132981 | A1 | 5/2016 | Cherry et al. |
| 2019/0102623 | A1 | 4/2019 | Flood et al. |
| 2021/0357083 | A1 | 11/2021 | Aspinall et al. |
| 2022/0244898 | A1 | 8/2022 | He et al. |
| 2023/0326202 | A1 | 10/2023 | Brunetti |

FOREIGN PATENT DOCUMENTS

| | | | |
|---|---|---|---|
| JP | 2018073325 | A | 5/2018 |
| KR | 101762622 | B1 | 8/2017 |
| KR | 20180121702 | A | 11/2018 |
| KR | 1933652 | B1 | 12/2018 |

OTHER PUBLICATIONS

Pourmoshir S. An Aerial Image Registration Tool [Internet] [Dissertation]. 2018. (IT). Available from: https://urn.kb.se/resolve?urn=urn:nbn:se:uu:diva-372091 (Year: 2018).*

Rao AS, Radanovic M, Liu Y, Hu S, Fang Y, Khoshelham K, Palaniswami M, Ngo T. Real-time monitoring of construction sites: Sensors, methods, and applications. Automation in Construction. Apr. 1, 2022;136:104099. (Year: 2022).*

Balaska V, Bampis L, Kansizoglou I, Gasteratos A. Enhancing satellite semantic maps with ground-level imagery. Robotics and Autonomous Systems. May 1, 2021;139:103760. (Year: 2021).*

Folsom Labs, HelioScope Webinar Training, https://www.youtube.com/watch?v=hxWGSVqdJ4o, Apr. 17, 2020.

Folsom Labs, HelioScope, https://help.helioscope.com/article/51-projrect-profiles, 2020, visited Mar. 12, 2021.

Jacob-Loyola, "Unmanned Aerial Vehicles (UAVs) for Physical Progress Monitoring of Construction," Sensors, Jun. 20, 2021, 27 pages.

Omar, "Data acquistion technologies for construction progress tracking," Automation in Construction, Oct. 1, 2016, 13 pages.

Paneru, "Computer vision applications in construction: Current state, opportunities & challengs," Automation in Construction, Dec. 1, 2021, 17 pages.

Rao, Real-time monitoring of construction sites: Sensors, methods, and applications, Automation in Construction, Apr. 1, 2022, 22 pages.

Reja, "Computer Vision-Based Construction Progress Monitoring," Automation in Construction, Jun. 1, 2022, 18 pages.

* cited by examiner

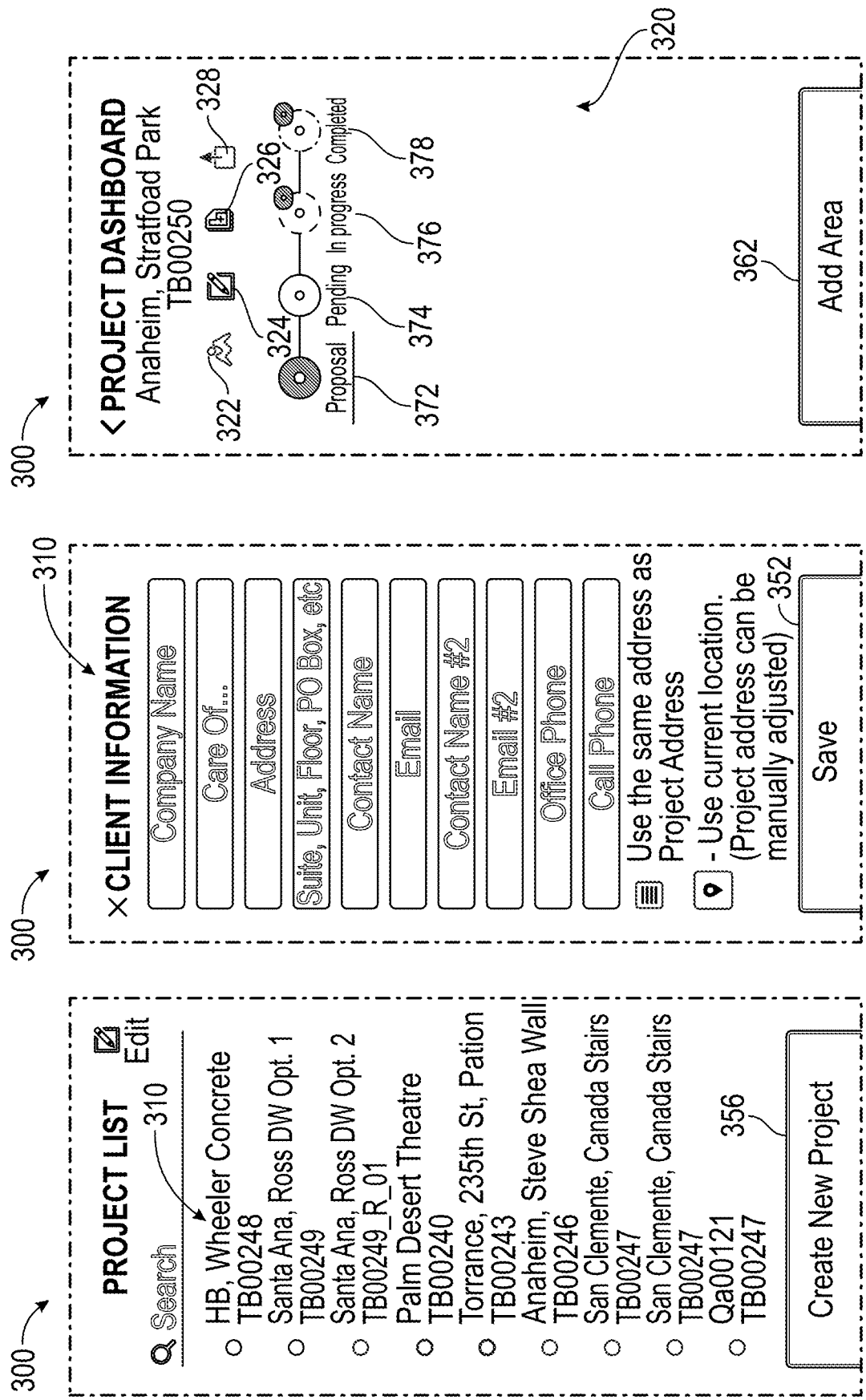

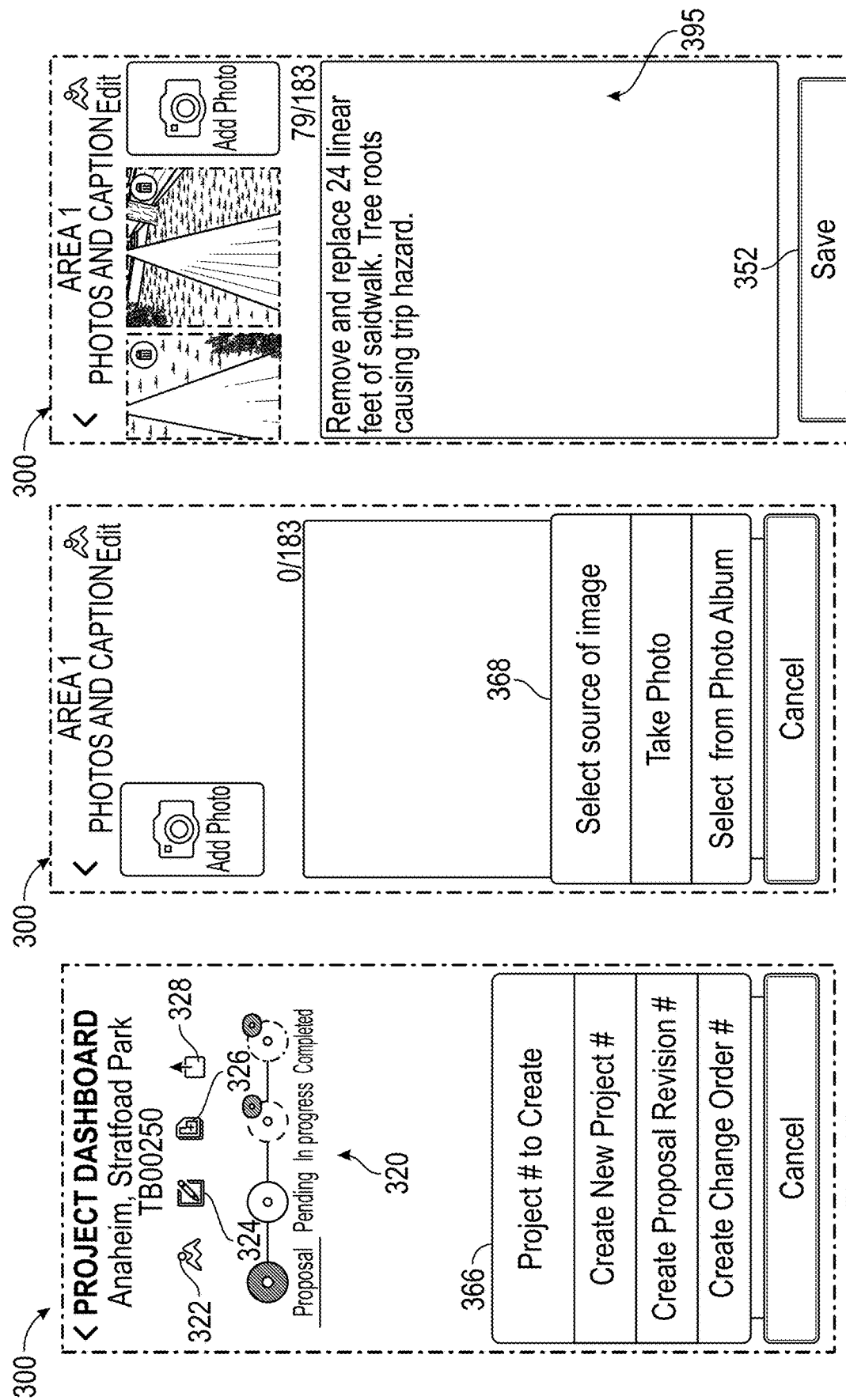

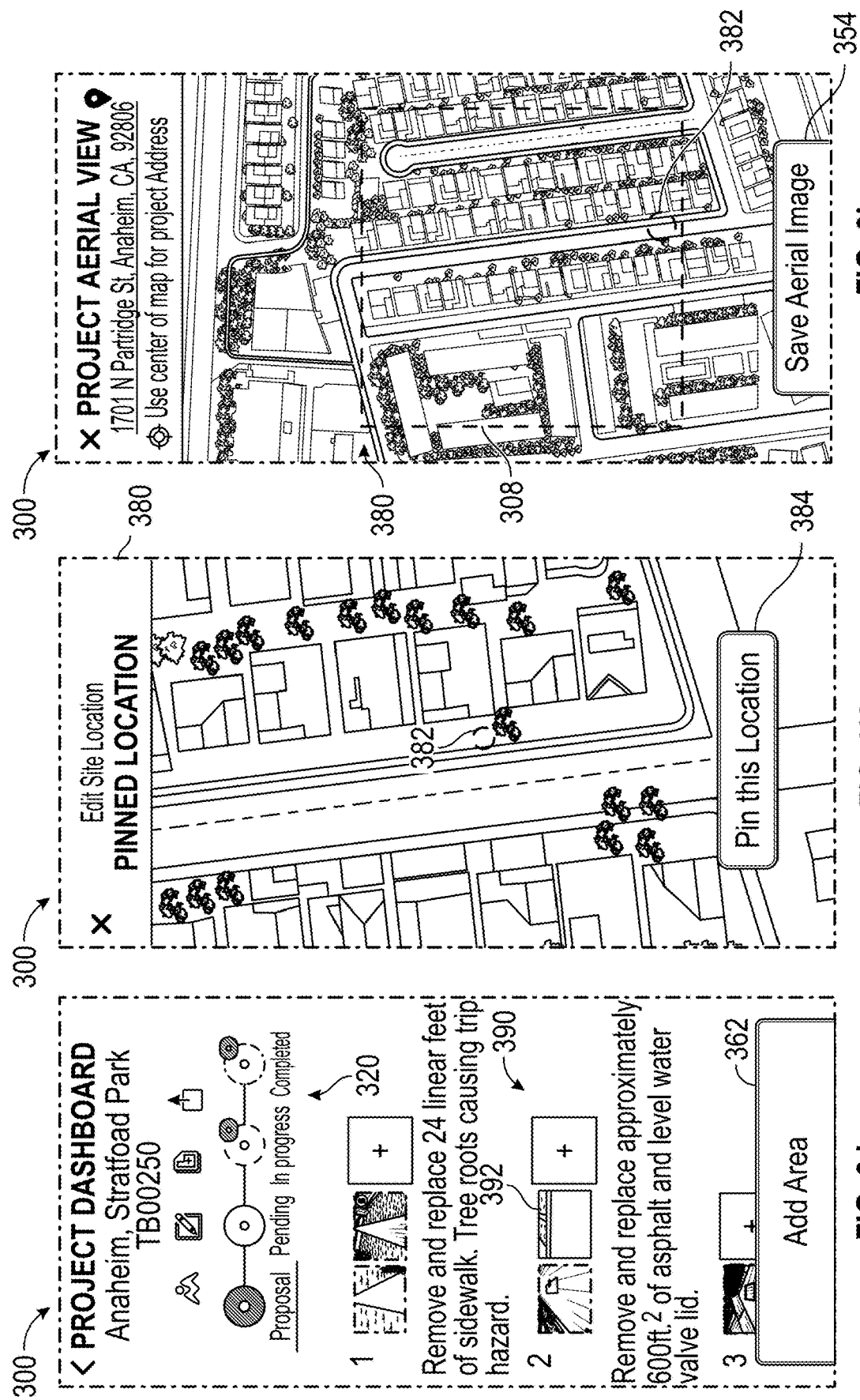

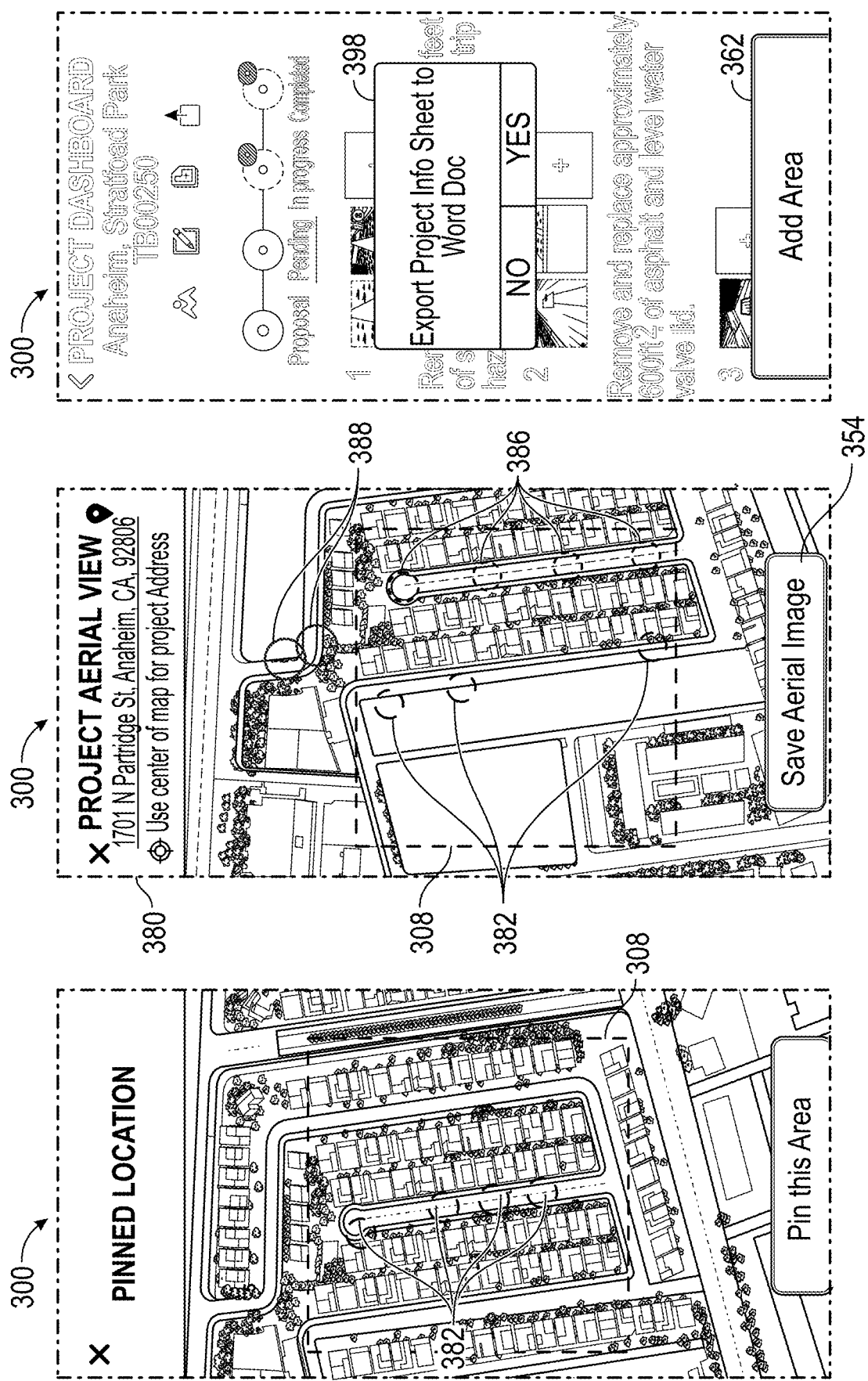

SYSTEMS AND METHODS FOR MAPPING PROJECT SITES USING GROUND AND AERIAL IMAGERY

CROSS-REFERENCE TO RELATED APPLICATIONS

This application is a continuation of U.S. patent application Ser. No. 18/296,864, filed on Apr. 6, 2023, titled "SYSTEMS AND METHODS FOR MAPPING PROJECT SITES USING GROUND AND AERIAL IMAGERY," which claims the benefit of priority under 35 U.S.C. § 119(e) to U.S. Provisional Application No. 63/362,658, filed on Apr. 7, 2022, titled "SYSTEMS AND METHODS FOR MAPPING PROJECT SITES USING GROUND AND AERIAL IMAGERY," which is hereby incorporated by reference herein in its entirety for all purposes.

BACKGROUND

Mapping project sites involves complex interactions among various kinds of data and imagery. Real-world imagery from both ground and aerial points of view require advanced computing and algorithmic resources. Modern approaches are limited in how they can receive, consolidate, and transfer the correct data and data types. Moreover, user ability to modify and supplement computer algorithms is greatly limited in modern systems. Accordingly, a need exists for improved computer algorithms and user interfaces for mapping project sites.

DETAILED DESCRIPTION

Overview

Real-world mapping techniques can be used for a variety of important tasks. The cartographic process begins with a need for mapping the real-world area, and such processes do not fully contemplate every need that may be associated with a mapped area. The need for the mapped area drives the conception and purpose of the map. By the spatial perspectives they provide, maps help shape how projects are managed and completed. The spatial perspectives may include ground perspectives, aerial perspectives, or other perspectives. Project managers may rely on a map and details within a map to identify needs, modify existing projects, deliver services to one or more site locations within the map, and complete existing projects. However, project managers cannot properly utilize information that is available from various perspectives for various site locations while simultaneously manipulating the relationships of those site locations. For example, progress of various site locations or status details of those site locations cannot properly be conveyed to a user using modern methods and systems.

Such challenges can be particularly present in the fields of construction work, repairs, city planning, maintenance requests, and the like. For example, city maintenance workers may receive several or dozens of maintenance requests within a particular area of the city. Such maintenance requests may be associated with individual site locations and may vary based on a location, maintenance type, or other factor. While modern satellite or other aerial imagery can be helpful in mapping a location, and while ground imagery from a user device (e.g., a personal camera, a smart phone, or other device) can be useful in identifying the specific nature of the need at a location, the merging of these kinds of data in a way that is useful can be challenging. Moreover, user interfaces that are intuitive for a user in visualizing, modifying, and otherwise interacting with these site locations are helpful furthering the benefit of algorithms that handle both aerial and ground imagery.

The systems and methods described herein provide highly dynamic and interactive user interfaces that enable a user, such as a site manager or project manager, to adequately and successfully manage multiple projects and to see them to completion according to an appropriate timeliness, budget, and level of quality. In particular, user interfaces described herein can connect the algorithmic benefits to a user in a way that is seamless and intuitive.

Each of these user interfaces may include rich GUI controls that are configured to respond to user interaction and input in a manner that allows the non-technical user to quickly and intuitively generate multiple projects within a project area or site area, review and update details (e.g., imagery) related to those projects, and even generate a report of proposed work, pending work, in-progress work, and/or completed work.

Figure 1:
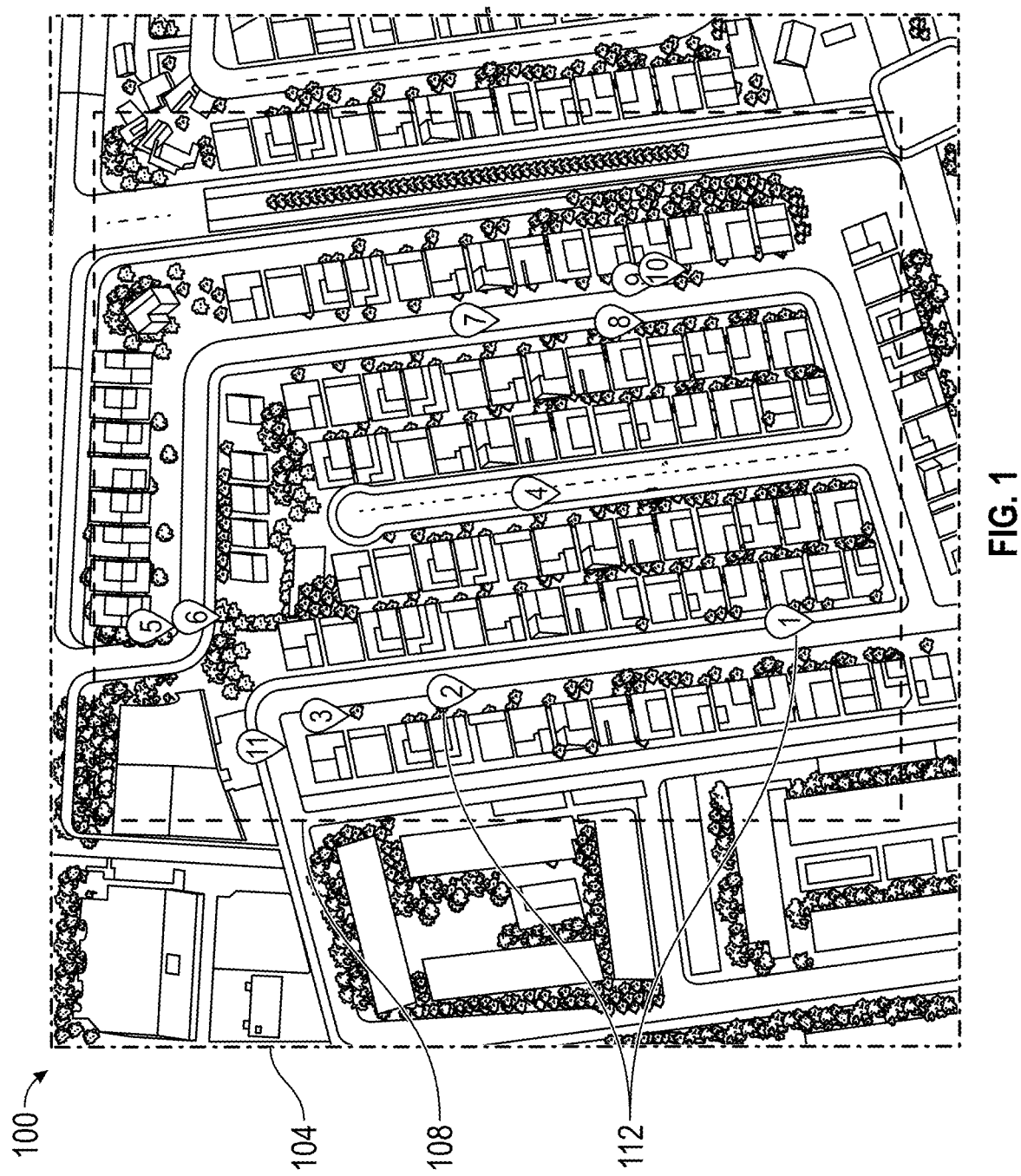
FIG. 1 illustrates an example user interface that can be generated from the systems and methods described herein.

FIG. 1 illustrates an example user interface 100 that can be generated from the systems and methods described herein. The user interface 100 may include aerial imagery 104, an indication of a site area 108, and/or one or more site locations 112 within the site area 108. The user interface 100 can include an interface on a personal computer or mobile device (e.g., smart phone, a laptop, or the like).

The aerial imagery 104 may include satellite imagery and/or imagery from other high-altitude sensors, such as balloons, airplanes, or other aircraft. The aerial imagery 104 can include stitched images that include a site area 108. The site area 108 can include one or more site locations 112, which may correspond to project site locations. The site area 108 may include all of the site locations 112 that are for a particular project. The site area 108 may include dotted and/or solid lines that represent future structures, dividing lines, sections, and/or other present and/or future (e.g., expected) features within the map aerial imagery 104. The site locations 112 can correspond to street locations, parkway locations, home or yard locations, or other locations. For example, the site locations 112 may refer to future structures to be built, sections where work is to be performed, areas where repairs are to be done, and/or other relevant locations for a project, area, or sub-area. As shown in FIG. 1, each site location 112 may be labeled for easy user identification. The position of the site location 112 within the aerial imagery 104 can be determined from one or more ground images (as described herein). The site area 108 may be identified within the user interface 100 by an indication of the site area 108, such as by a colored box or other indication.

Figure 2A:
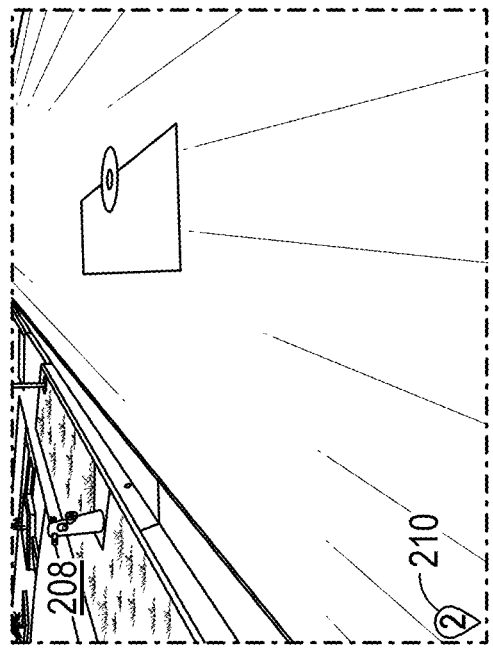
FIGS. 2A-2D show example ground images that correspond to respective site locations of FIG. 1.
Figure 2B:
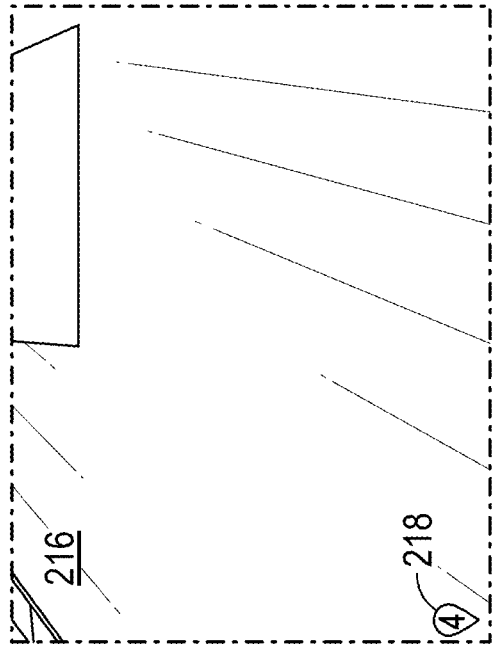
Figure 2C:
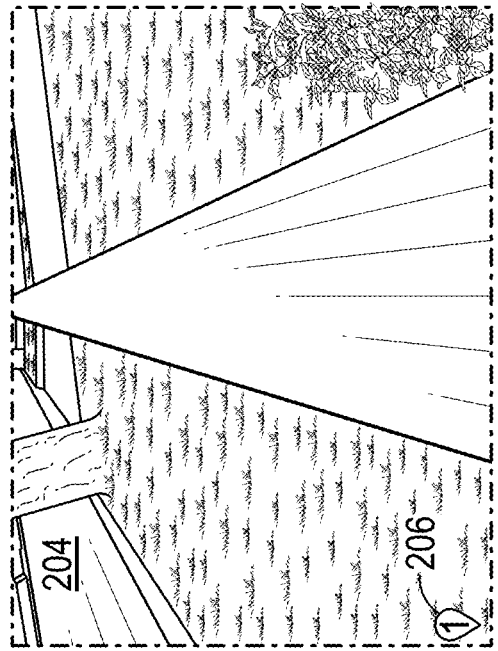
Figure 2D:
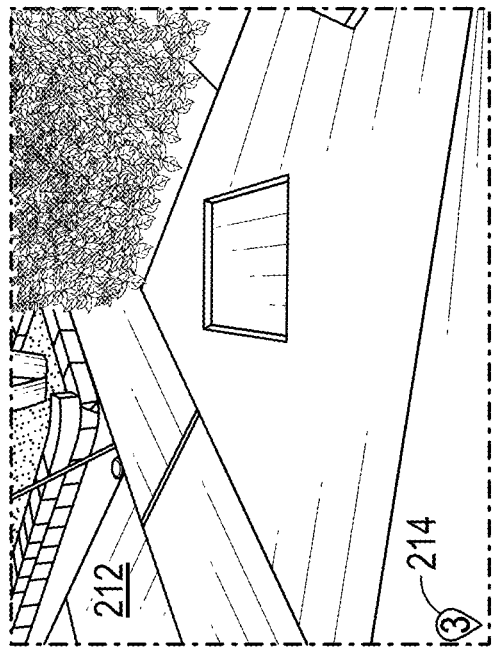

FIGS. 2A-2D show example ground images that correspond to respective site locations 112 of FIG. 1. For example, FIG. 2A shows a first ground image 204 that corresponds to a first site location marker 206. FIG. 2A shows a portion of a sidewalk that requires repairs. FIG. 2B shows a second ground image 208 that corresponds to a second site location marker 210. The second ground image 208 illustrates a portion of a street that requires repairs. FIG. 2C shows a third ground image 212 that corresponds to a third site location marker 214. The third ground image 212 illustrates some concrete work that is required. FIG. 2D shows a fourth ground image 216 that corresponds to a fourth site location marker 218. The fourth ground image 216 indicates certain work that is required on a street.

Figure 3C:
FIGS. 3A-3O show various aspects of a user interface that may be used in combining ground and aerial imagery for mapping a project site.
Figure 3B:
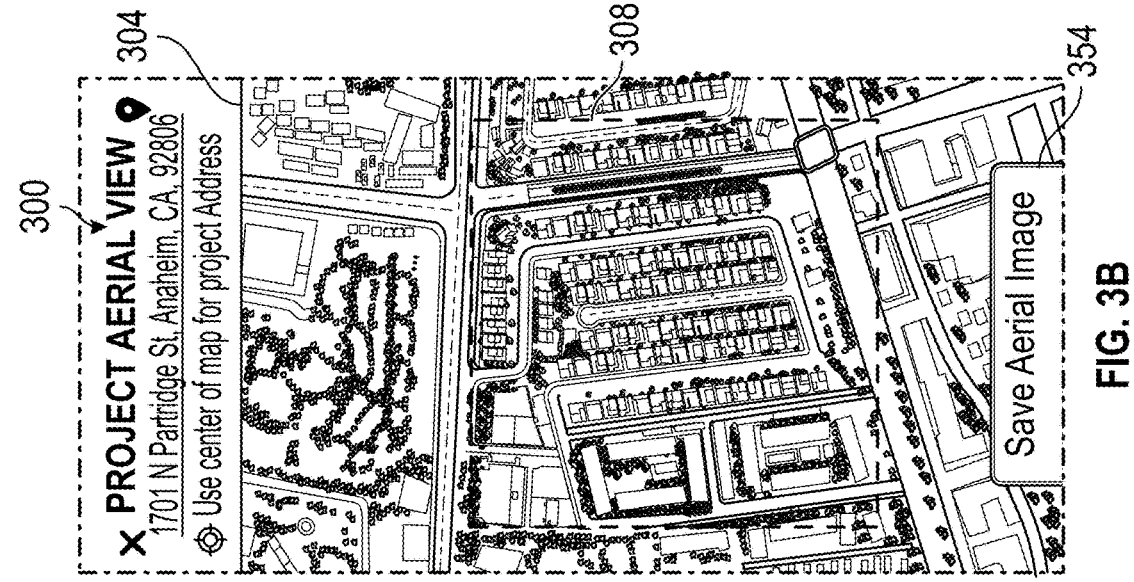
Figure 3A:
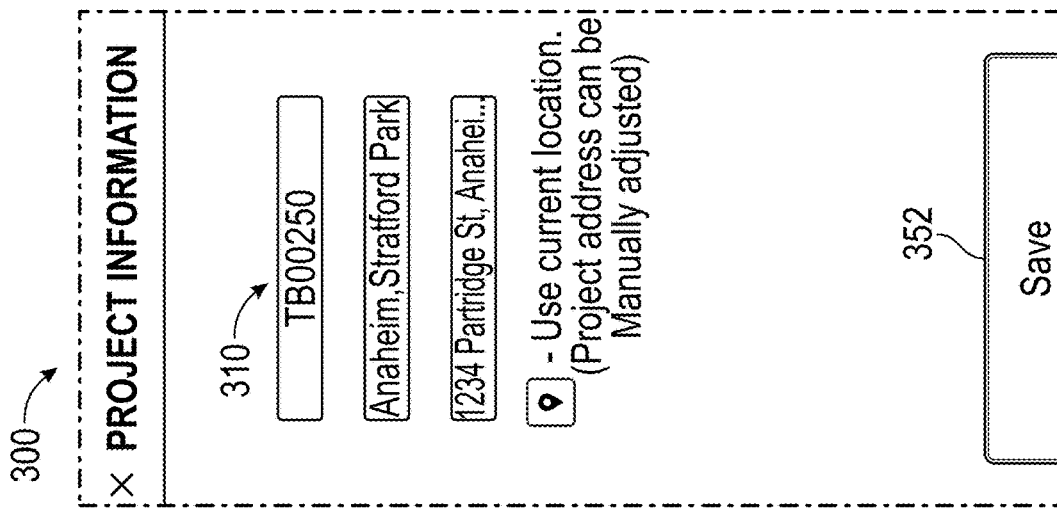

FIGS. 3A-3O show various aspects of a user interface 300 that may be used in combining ground and aerial imagery for mapping a project site. FIG. 3A shows an example project interface 310 within the user interface 300. The project interface 310 can allow a user to create a new project. For example, the project interface 310 may allow a user to copy an existing project or portion of a project to create the new project. The project interface 310 can allow a user to name the project, identify a general geography (e.g., city, state, cross streets, region, etc.) associated with the project. Additionally or alternatively, the project interface 310 can allow a user to identify a specific geography (e.g., street address, GPS coordinates, etc.). Once the project has been completed a user may select the save selector 352 to save the project. A project may include required and/or optional portions of the job. Optional portions may be associated with individual site locations and may be displayed differently from required site locations.

FIG. 3B shows aerial imagery 304 (which may correspond to the aerial imagery 104 of FIG. 1), within which a site area 308 is identified. In some embodiments, the user may be able to manually select the boundaries of the site area 308. For example, a user may be able to draw (e.g., with a selector within the user interface 300, using fingers to draw) boundaries of the site area 308. As shown, the boundaries may be indicated by a colored line. Additionally or alternatively, the user may be able to manually shift the size and/or location of the site area 308 within the aerial imagery 304. For example, FIG. 3C shows how the site area 308 has been modified relative to FIG. 3B. Additionally or alternatively, a user may be able to create sub-areas within the site area 308. For example, the aerial imagery 304 in FIG. 3C can represent a sub-area where a sub-group of site locations may be located. In some embodiments, a user may be able to zoom into a particular portion of a site area (or of a different portion of the aerial imagery) to better identify a site location, a site area, and/or a site sub-area, which may include one or more site locations of the site area.

In some embodiments, the system may allow a user to view a rendition of how a completed structure or completed job may look once complete. The system may be able to determine a size (e.g., width, height, length) of a structure or work area and present the rendered completed structure or work within an appropriate location and dimensions within existing structures and features of the aerial imagery 304. In some embodiments, only an administrator of the system (e.g., a user having proper authorization credentials) can add or alter the future structures or other rendered features. In some embodiments, the system may display gray lines, a watermark, a translucent structure, or some other faint indicator of the rendered feature as an overlay to the map. Additionally or alternatively, the system may store (e.g., as a PDF or other file) blueprints or other formal rendering of a structure and overlay an outline (e.g., dotted line) over existing structures or areas on the aerial imagery 304.

FIG. 3D shows another aspect of the project interface 310 within the user interface 300. The project interface 310 shown here allows a user to select a project from within a list of existing projects. As shown, a user can create a new project by selection of the create new project selector 356. FIG. 3E shows yet another aspect of the project interface 310 that allows a user to enter associated client information, including a company name, address, contact name, email, phone number, and any other related client information.

FIG. 3F shows an example status interface 320 of the user interface 300. Within the status interface 320, a user may be able to view or modify a status (e.g., status of completion) of one or more site locations or other aspects of a project. For example, a user may select a proposal indicator 372 to view and provide additional information related to proposals associated with a project. A user can select the pending indicator 374 to view and provide additional information related to pending jobs associated with the project. Using the in-progress indicator 376 a user can view and provide additional information related to jobs that are in progress. Additionally or alternatively, the status interface 320 can allow a user to see completed jobs and/or update details of completed jobs by selecting the completed indicator 378. Using the add location selector 362 a user can add one or more locations to a proposal, pending, in-progress, and/or completed job. FIG. 3G shows a project modification selector 366 in response to the selection of the add location selector 362. Using the project modification selector 366 a user can create a new project, create a proposal revision, create a change order, and/or take additional action in certain embodiments. Additionally or alternatively, the project modification selector 366 may allow a user to transfer data from one portion of the status interface 320 to another (e.g., from pending to in-progress). The system may allow a user to revert to a previous status (e.g., undo a change to a status). In some embodiments, the user may be able to view certain site locations associated with a first status while having site locations associated with one or more other statuses omitted or otherwise obscured from view. In this way, a user may be able to focus in the site locations of a target status more easily.

As shown in FIG. 3F, the in-progress indicator 376 and the completed indicator 378 include a shaded circle indicator at the top-right of each of the respective indicators 376, 378. The shaded circle indicator can signal that the respective status indicator includes one or more documents, photographs, details, and/or other features associated with respective job site and/or status. The shaded circle indicator may be included with the proposal indicator 372, the pending indicator 374, the in-progress indicator 376, and/or the completed indicator 378.

As shown in FIG. 3G, the status interface 320 can include one or more selectors for improved user interface functionality. For example, the status interface 320 may include one or more of a site location editor selector 322, a status modification selector 324, a copy selector 326, and/or an export selector 328. A user may select the location editor selector 322 to enter a site location editor (e.g., the site location interface 380, as variously shown in FIGS. 3K-3N). A user can select the status modification selector 324 to update a status of a site location (e.g., changing to/from proposed, pending, in-progress, completed), which is described in more detail below. A status of a site location may be indicated by the status interface 320 and/or modified within the status modification interface 390. A user may select the copy selector 326 to copy one or more details (e.g., ground imagery, status, written description) associated with an existing site location. This may allow a user to quickly duplicate an existing job and/or indicate a change in a status of a job without having to create the job from scratch again. Additionally or alternatively, a user may select the export selector 328 to export a report associated with one or more jobs, as described below (e.g., with respect to FIG. 3O). The export selector 328 may allow a user to share one or more details associated with the existing site location to another user (e.g., another user of the system).

In some embodiments, a user may be able to attach a business card and/or associated contact information to an existing job or phase of the job. The contact information may be accessible to a user of the system and/or may include a contractor's name, contact number, type of service to be provided, an estimated time of completion, and/or a cost estimate for completion of the work. In some embodiments, the system can allow a user to directly contact the individual (e.g., contractor) by pressing an associated selector (e.g., call, text message).

FIG. 3H shows another aspect of the user interface 300 that allows a user to add one or more ground image photographs associated with a site location. Using the aspect of the user interface 300 that is shown in FIG. 3H, a ground image can be received via photograph from a photo album or from a taken photo from an associated camera (e.g., from a smart phone, etc.). The system may allow a user to modify the photograph (e.g., crop, reframe, enlarge, shrink) that is displayed. In some embodiments, the camera may be associated with the user interface 300 (e.g., the user interface 300 may be displayed on a device that includes the camera).

FIG. 3I shows a location description interface 395 that may allow a user to see the ground images and written details associated with the site location. A user can update, remove, or otherwise modify the ground images and/or written details associated with the site location. A user can save the images and written details associated with the site location by selecting the save selector 352. In some embodiments, a user can place physical markers to be included in a photograph. The physical markers may include discs, paint, tape, or some other visual marker. The system may be configured to identify the physical marker and, based on the physical marker, place a geometric feature (e.g., arrow, shape, animation, highlight, etc.) over at least one of (or each of) the physical markers within the photograph. The geometric feature may be saved in the system and/or displayed as part of the image file. Additionally or alternatively, the system may display the geometric feature as part of the aerial imagery (e.g., aerial imagery 104, aerial imagery 304) described herein. The geometric feature may help a user identify a feature of interest within the photograph for later review. In some embodiments, the system may automatically overlay the geometric feature over the physical marker by automatically identifying the physical marker within the photograph. Additionally or alternatively, the system may identify the physical marker and present an option to the user (e.g., via a system alert or other selector) to include the geometric shape within the photograph. In some embodiments, the system allows a user to manually choose a type/location of and/or embed the geometric shape into the image file.

In some embodiments, a user may be able to provide certain data for each of the site locations. Such data may be of a common type that can be aggregated (e.g., summated) by the system and conveyed to the user. For example, in some embodiments, the system can receive one or more dimensions associated with each of the one or more site locations. The system can tag (e.g., by inserting the data into a text box, by completing a different kind of data input selector) the associated one or more site locations with the one or more dimensions. The system may be able to calculate, based on the one or more dimensions associated with the one or more site locations, a total dimension associated with a sub-area (or site area) comprising the one or more site locations. For example, this functionality may be able to provide a total area calculation associated with the site area. Additionally or alternatively, such dimensions may be converted to a different kind of calculation. For example, one dimension may be based on another dimension. In some cases, for example, a total cost calculation may be done by knowing a cost-per-area associated with a project. In this way, the user can obtain a total cost estimate based on a known cost per area and a total area associated with the whole project. This can allow a user to select and/or deselect certain portions of the project that are needed or not needed (e.g., site areas that may exceed a total budget). Optional or required project portions may be selected or deselected, in some embodiments. This kind of functionality can improve a user experience with the user interface and can ensure higher accuracy. Cost estimates may be included in the system previously (e.g., to produce a somewhat accurate first approximation of the cost) and may be further refined by a user selection of the cost estimate (e.g., total cost, cost per area, etc.). In some embodiments, the system may be able to automatically calculate a cost estimate based on one or more features, such as a location within a city, a size of an area of the site location, a type of job required, an amount of required material, a number of expected workers to complete the job, and/or other factors.

FIG. 3J shows the status interface 320 with a list of site locations within a status modification interface 390. A user may access the status modification interface 390 at least by selection of the status modification selector 324. The status modification interface 390 can include, for each site location, one or more ground images and a ground image selector 392 that allows a user to select additional ground images (e.g., via taking a photo, selecting a stored image). The status modification interface 390 can additionally or alternatively include a summary or full description of the written details associated with each location. In some embodiments, the status modification interface 390 includes as many site locations and associated ground images and/or written details as can legibly fit within the limited space of the user interface 300. For example, mobile device user interfaces may have limited space for displaying legible written descriptions or intelligible images that are useful for a user. Status updates and/or modifications to written details and/or ground imagery of a site location may be time stamped so that at a later time, a user can identify when certain changes were added, when a status update was made, or similar. This can help a user improve accuracy with management of the site locations.

A project may include one or more jobs, each of which can have a corresponding set of statuses (e.g., proposed, pending, in-progress, completed, etc.). Such sub-jobs can be useful in allowing a user to break a project into one or more phases. This may allow a contractor, for example, to have smaller chunks of work only visible to workers at a particular time, so as not to overwhelm and/or confuse the workers.

FIG. 3K shows a site location interface 380 within a user interface 300 that can allow a user to specify a geographical location or position of the site location. A user may enter the site location interface 380 at least by selecting the site location editor selector 322. As noted above, one advantage of certain embodiments disclosed herein is that the computing system may be able to automatically and/or in real-time identify a precise or at least approximate geographic location of the site location by combining the details from one or more ground images associated with the site location and aerial imagery that includes the site location. For example, the photos of the ground imagery may include metadata that can identify the location of site location. Such metadata may include a GPS location associated with the photo. Additionally or alternatively, the metadata can include a time of when or approximately when the photo was taken. The computing system may automatically identify a position of a GPS of the camera based on the time associated with the photo. For example, the computing system may receive one or more GPS coordinate positions from a mobile device (e.g., smart phone) and may identify a GPS location associated with the time the photo was taken to identify a geographic position associated with the imagery in the ground image(s). The computing system can automatically update earlier-uploaded or earlier-taken photographs (e.g., from original bid, from in-progress, from completed) based on the GPS location determined by the system. For example, a user may take initial photographs and upload them to the system for an original bid. The user may go back to the same location and the system may determine that the new photographs have the same or similar enough coordinates (e.g., within a location threshold).

The system may generate an alert (e.g., a pop-up message, a push notification, a text message, an in-system message, etc.) that allows a user to confirm that the photograms correspond to previously taking photographs. In some embodiments, the system may automatically update the photos without requiring user input. Additionally or alternatively, the system may generate a confirmation alert that the photographs have been updated. The updated photographs may only be updated in the currently selected phase (e.g., original bid, in-progress, etc.) or the photographs may update a later phase. The determination of which phase to update the photographs in may be based on user input (e.g., a confirmation alert) or automatically based on factors identified by the system, such as a currently selected phase or a default setting. In some embodiments, the computing system can place an approximate site location indicator within the user interface 300 to allow a user to fine-tune the positioning of the site location indicator. The system may cause uploaded photographs to be automatically pinned and/or tagged to location of the job site. The pinned and/or tagged location may be based on metadata saved with and/or otherwise associated with the photographs. Additionally or alternatively, the location may be based on from where the photograph was taken and/or uploaded. The system may suggest a location within the map for the pinned location. The suggested location may be based on a previously pinned location based, for example, on GPS coordinates and/or other metadata associated with the previously pinned location.

As shown in FIG. 3K, a site location indicator 382 can be displayed based on one or more of a GPS location associated with a ground image previously received or associated with the site location and/or based on a user selection of the location of the site location. The site location indicator 382 can include a colored shape or combination of shapes (e.g., yellow circle surrounding a dot, a red pin, a reticle, etc.). In some embodiments, the system may allow a user to manually move the site location indicator 382 around within the map. For example, the user may drag the map around (e.g., thereby moving a fixed site location indicator 382) and/or by setting the site location indicator 382 to a target location on the map. Other shapes, line styles, colors, etc. are possible. Using a pin location selector 384 a user can save the location and/or appearance of the site location indicator 382.

As shown in FIG. 3L, the site location indicator 382 can be displayed within the site area 308 of the aerial imagery 304. Thus, one or more site location indicators can be selected and saved to a particular project. The aerial imagery 304 and its associated displayed contents can be saved in response to user selection of the save aerial image selector 354.

FIG. 3M shows another site area 308 that includes a plurality of site location indicators 382 that can be modified within the site location interface 380. As shown, the site area 308 includes a colored (e.g., blue) box indicating the boundaries of the site area 308. Each of the site location indicator 382 are shown to be along the same street. In some embodiments, a user could create a sub-area within the site area 308 (which may include its own boundary indicator) to specify that the site location indicators 382 shown in FIG. 3M are within the same sub-area of the same site area 308 associated with a project. A user may be able to select one or more of the site location indicators 382 to display another aspect of the user interface 300 (e.g., the location description interface 395, the status modification interface 390, the status interface 320, etc.) to allow for easier and more accurate modification and update of the associated site location (e.g., updating a status (proposed, pending, in-progress, completed, etc.), adding ground imagery, modifying written details, etc.).

In some embodiments, a modified site location indicator 382 may be visually updated in response to user selection and modification of the ground imagery, status, written description, etc. associated with the site location. For example, in some embodiments, a user may update a status of a site location from pending to in-progress. Such a change may correspond to a change in a visual indicator of the site location indicator 382 relative to other site location indicators 382. Additionally or alternatively, a sub-group of site location indicators 382 may be associated with a first visual display scheme while a second sub-group of site location indicators 382 may be associated with a second visual display scheme. Additionally or alternatively, a user may manually change how one or more site location indicators 382 are displayed.

FIG. 3N shows an example of site location indicators 382 having a first visual display scheme along with updated site location indicators 386 having a second visual display scheme. The updated site location indicators 386 may have been updated according to an associated sub-group, based on a change in status, a change/addition in associated ground imagery or written details, or some other aspect. As shown, the four updated site location indicators 386 of FIG. 3N represent the site locations corresponding to the site location indicator 382 of FIG. 3M. Thus, a use may have pinned the locations of the site location indicator 382 of FIG. 3M and then modified them, resulting in the display of the updated site location indicator 386 within FIG. 3N. In some embodiments, a user may be able to select and/or modify a group of site location indicators 382 simultaneously.

Other site locations outside the site area 308 but within the aerial imagery 304 may be displayed as well. For example, excluded site location indicators 388 may be displayed but may not be part of the selected project. Excluded site locations may be useful for a user to see even though they may not be currently part of the selected project. For example, a user may be interested in merging excluded site locations into the existing project based, for example, on proximity and/or some other metric. In some embodiments, the system can automatically merge excluded site locations based on the excluded site locations being within a preselected threshold. For example, a user may select a threshold such as a maximum distance from a closest site location within the project, a maximum average distance from the other site locations, a maximum travel distance to the closest site location, an address of the excluded site location, a nature of the work required at the excluded site location, an estimated time for completion associated with the work at the site location, a customer associated with the excluded site location, and/or some other threshold. Thus, the system may help a user consolidate site locations within fewer projects and/or a smaller or otherwise more accessible or intuitive project grouping.

FIG. 3O shows a user ability to export a report of the project details to a remote computing device. A user may choose to manually create and/or export the report at least by selection of the export selector 328. Another advantage offered by certain embodiments described herein is the ability for the system to automatically prepare a report of one or more aspects of the project and transmit the report to another device. The report may include the ground imagery, written details, and/or geographical location (within the aerial imagery) of the site locations that are proposed, pending, in-progress, and/or completed. For example, a user may want to submit a bid on a proposed project having one or more associated site locations that need work done. The report may include any of the details shown in any of the figures and described herein, such as one or more indicators, a map of the of the site area, and/or user input. The report may be data for display in another user interface or for printing by a printer. In some embodiments, the report is generated automatically in response to a user updating a status of each of the jobs in a project (e.g., all proposed jobs finalized, all proposed jobs moved to pending, all pending jobs to in-progress, all in-progress jobs to completed), or in response to some other input. In response to user selection of the export confirmation selector 398 a user may confirm that the report should be exported to the remote computing device. in some embodiments, the exported report can be a zip file of each of the locations in each status (e.g., proposed, pending, in-progress, and completed) in response to user section of the export confirmation selector 398. In some embodiments, the system can export only a portion of the sub-area. This feature may allow a user to protect sensitive data so that improper individuals do not obtain information related to other sub-areas, for example. Exporting may be in the form of a PDF in some cases and/or a hyperlink to electronic data for making the report.

Figure 4:
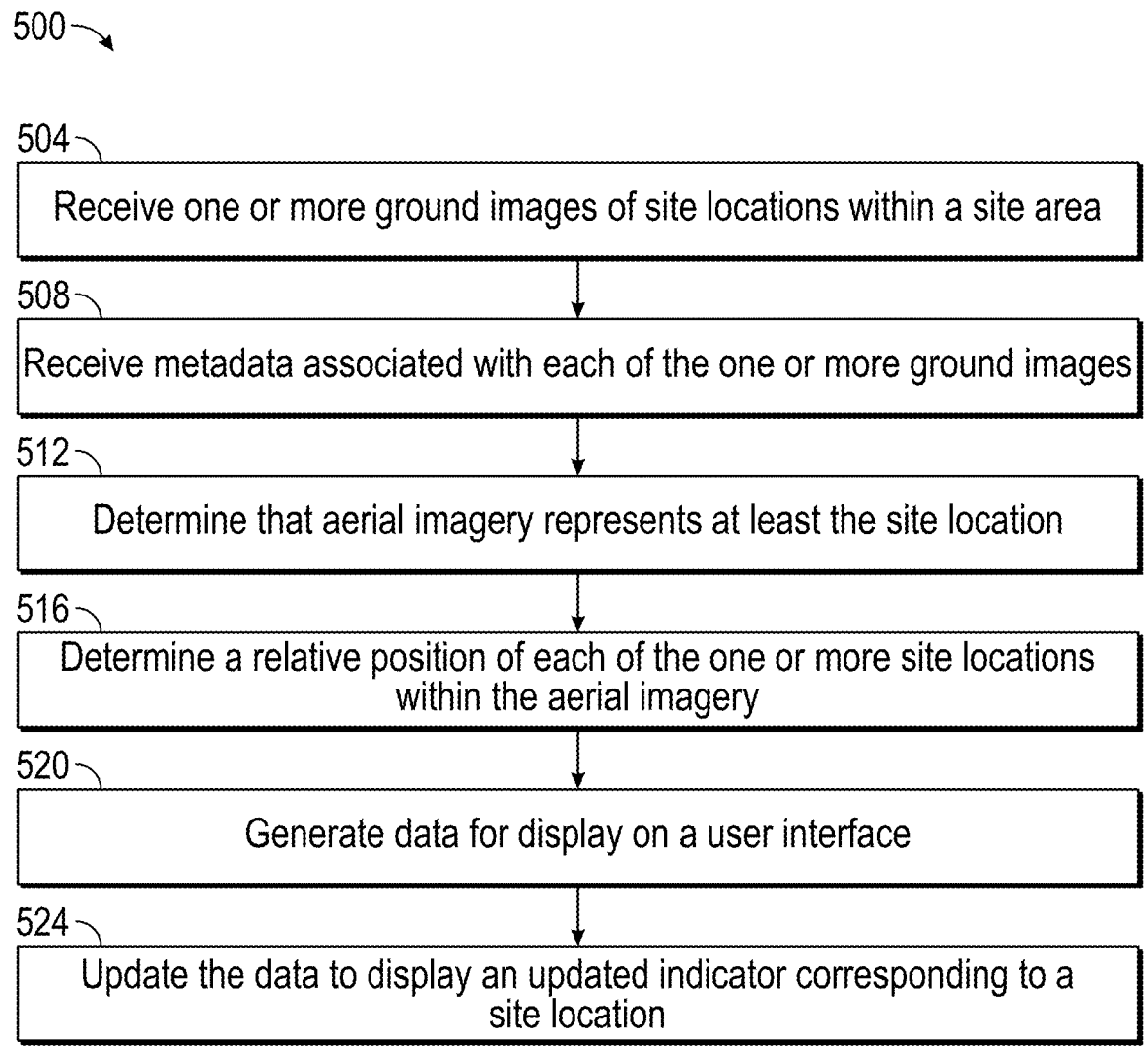
FIG. 4 shows an example embodiment of a method that may be implemented to provide certain features discussed herein.
Figure 5:
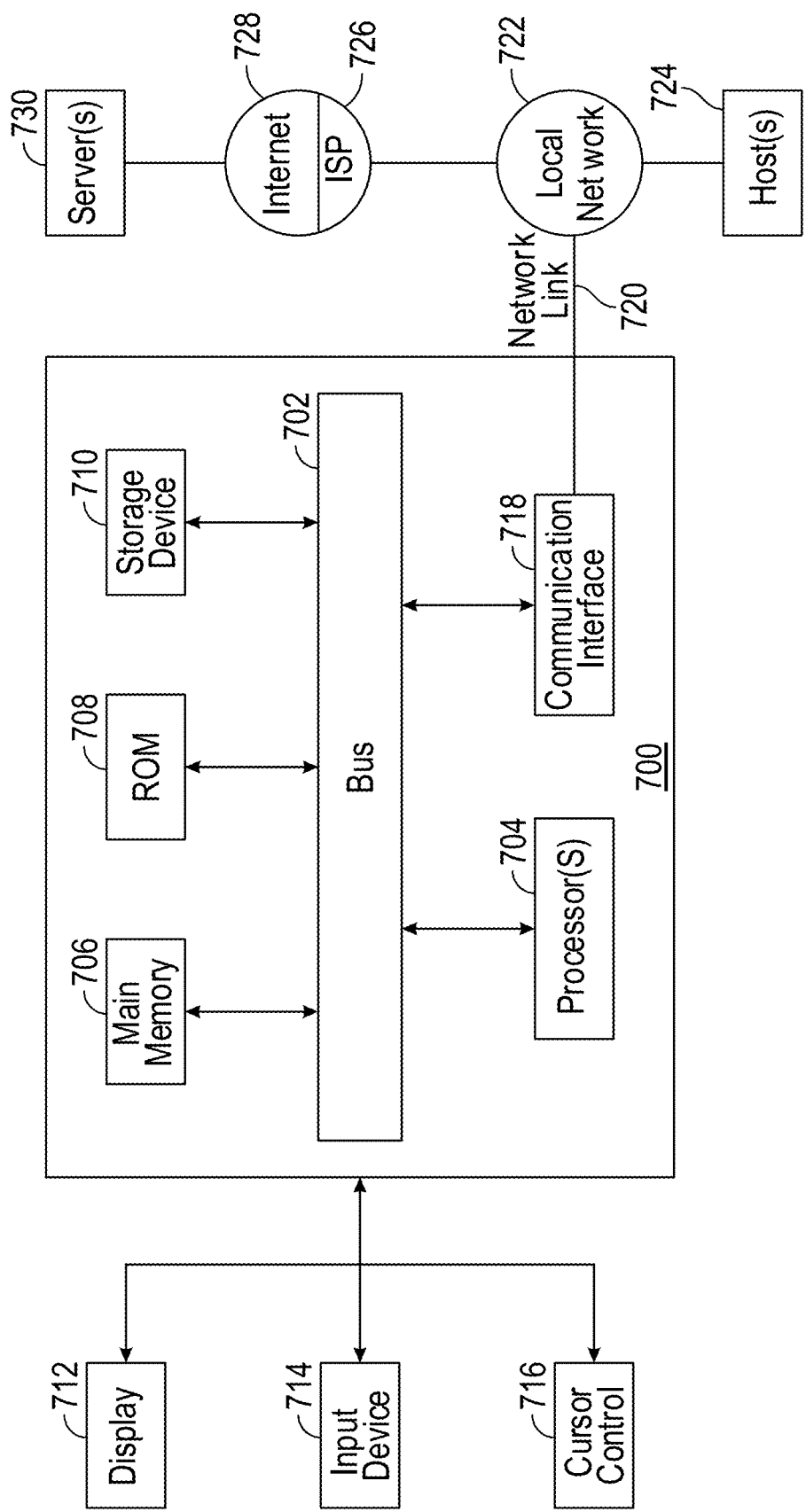
FIG. 5 is a block diagram illustrating one example of a computer system upon which various embodiments may be implemented.

FIG. 4 shows an example embodiment of a method 400 that may be implemented to provide certain features discussed herein, such as by the computing system 700 (FIG. 5), a user computing device, and/or other computing devices described herein. Depending on the embodiment, the process may include further or additional blocks. Additionally or alternatively, the blocks may be performed in an order different than is illustrated.

At block 404, the method 400 can include receiving (e.g., via a data interface of the computing system) one or more ground images of site locations within a site area. At block 408 the system can receive metadata associated with each of the one or more ground images. The metadata may include corresponding GPS coordinates of the ground images. At block 512 the system can determine that aerial imagery represents at least the one or more site locations. For example, the aerial imagery may include imagery of the site area as well as imagery outside the site area. Some site locations may be outside the site area and/or the aerial imagery.

At block 516, the system can determine a relative position of each of the one or more site locations within the aerial imagery. In some embodiments, the relative position of each of the one or more site locations may be determined based on the metadata. For example, the system may use the GPS coordinates or other location data associated with the ground images to determine the relative location of one or more site locations (e.g., within the aerial imagery). Determining the relative position of each of the one or more site locations may be based on imagery captured by the one or more ground images. For example, the system may identify environmental markers within the imagery that help identify the relative position. Additionally or alternatively, a user may identify the relative location associated with each of the one or more site locations, and/or the user may further refine a relative position previously identified by the system.

At block 520, the system can generate data to display one or more features on a user interface. For example, the data may be configured to display a map of at least the site area, an indication of at least a portion of the site area within the map, an indicator corresponding to each of the one or more site locations within the site area, a selector for user selection, and/or any other indicator or selector or feature described herein.

At block 524, the system can receive (e.g., via the user interface) user selection of an indicator that corresponds to a site location of the one or more site locations within the site area. The indicator may be a selector for modifying one or more details associated with the site location. For example, in response to user selection of the interface, the system may update the data to display another aspect of the user interface, which can allow a user to insert written details about and/or ground imagery associated with the site location. For example, at block 524 the system can update the data to display on the user interface a selection interface within the user interface to allow the user to modify data (e.g., written details, imagery, etc.) associated with the site location corresponding to the indicator. In some embodiments, the system may help a user locate a particular site location in real-time. For example, a user may select a "locate location" (or similar) selector (e.g., button). In response to this selection, the system may indicate directions (e.g., walking directions, driving directions, etc.) to the site location. Such directions may be automatically determined based on (and/or coming from) a user's current location.

The system may receive user input via the selection interface and, based on the user input, update the data to display an updated indicator corresponding to the site location. The updated indicator may be displayed in a different color, be displayed in a different location, be a different size, and/or include some other visual or other distinction that allows a user to distinguish between the previous indicator and the updated indicator. For example, the indicator may have one or more features associated with the site location indicators 382 and/or the excluded site location indicators 388 described above. Additionally or alternatively, the updated indicator may have one or more features associated with the updated site location indicators 386 described above.

Updating the data associated with a site location can be beneficial. For example, the user may be able to use additional images to show how progress of work at a site location has progressed. In some embodiments, a user may be able to add a second image corresponding to the site location. The user interface may include an indication that the second image represents updated imagery of the site location. The indication could include how the second image is positioned relative to the first image, and/or the indication could be indicated by a progress or status indicator (e.g., of the status interface 320) described herein.

Example Embodiments

Some nonlimiting examples are presented below by way of illustration.

In a 1st Example, a computer-implemented method for mapping a project site using ground and aerial imagery, the method comprising: receiving, via a data interface, one or more ground images of site locations within a site area; receiving metadata associated with each of the one or more ground images, the metadata comprising corresponding GPS coordinates; determining that aerial imagery represents at least the one or more site locations; determining, based on the metadata, a relative position of each of the one or more site locations within the aerial imagery; generating data to display on a user interface: a map of at least the site area; an indication of at least a portion of the site area within the map; and an indicator corresponding to each of the one or more site locations within the site area; receiving, via the user interface, selection of an indicator corresponding to a site location of the one or more site locations within the site area; based on the selection of the indicator, updating the data to display on the user interface a selection interface within the user interface to allow the user to modify data associated with the site location corresponding to the indicator; receiving user input via the selection interface; and based on the user input, updating the data to display an updated indicator corresponding to the site location.

In a 2nd Example, the method of Example 1, wherein determining the relative position of each of the one or more site locations is further based on imagery captured by the one or more ground images.

In a 3rd Example, the method of any of Examples 1-2, further comprising: receiving, via the data interface, one or more second ground images of the site locations within the site area; updating the data to display on the user interface: a first image of the one or more ground images corresponding to a first site location; a first image of the second one or more ground images corresponding to the first site location; and an indication that the first image of the second one or more ground images represents updated imagery of the first site location relative to the first image of the one or more ground images.

In a 4th Example, the method of any of Examples 1-3, further comprising: receiving, via the user interface, user selection of an export selector; in response to the user selection of the export selector, transmitting to a remote computing device a report comprising: the map of at least the site area; the indication of the at least the portion of the site area within the map; and an indicator corresponding to each of the one or more site locations within the site area; the updated indicator corresponding to one of the one or more site locations; and the user input associated with the updated indicator.

In a 5th Example, the method of any of Examples 1-4, further comprising: determining a first status of completion associated with a first set of the one or more site locations; determining a second status of completion associated with a second set of the one or more site locations; and updating the data to display first status indicators corresponding to the first set and to display second status indicators corresponding to the second set.

In a 6th Example, the method of Example 5, further comprising: receiving, within the user interface, user selection of a selector corresponding to the first set; and displaying the first status indicators without displaying the second status indicators.

In a 7th Example, the method of any of Examples 1-6, wherein receiving metadata associated with each of the one or more ground images comprises receiving the GPS coordinates from a mobile device associated with the mobile device at around a time the ground images are obtained.

In an 8th Example, the method of any of Examples 1-7, wherein determining the relative position of each of the one or more site locations within the aerial imagery is based at least in part on a location associated with a mobile device when the ground images are obtained or a time associated with when the ground images are obtained.

In a 9th Example, the method of any of Examples 1-8, wherein determining the relative position of each of the one or more site locations within the aerial imagery is based on the one or more GPS coordinates.

In a 10th Example, the method of any of Examples 1-9, further comprising: receiving, the user interface, user zoom input associated with the site area; based on the user zoom input, updating the data to display an indication of a site sub-area within the site area, the site sub-area comprising at least one of the site locations.

In a 11th Example, the method of any of Examples 1-10, wherein modifying the data associated with the site location corresponding to the indicator comprises at least one of: providing one or more dimensions associated with one or more site locations; tag the associated one or more site locations with the one or more dimensions; or calculating a total dimension associated with a sub-area comprising the one or more site locations.

In a 12th Example, a computer system comprising: a computer readable medium storing computer executable instructions; one or more hardware processors in communication with the computer readable medium and configured to execute the computer executable instructions in order to: receive, via a data interface, one or more ground images of site locations within a site area; receive metadata associated with each of the one or more ground images, the metadata comprising corresponding GPS coordinates; determine that aerial imagery represents at least the site location; determine, based on the metadata, a relative position of each of the one or more site locations within the aerial imagery; generate data to display on a user interface: a map of at least the site area; an indication of at least a portion of the site area within the map; and an indicator corresponding to each of the one or more site locations within the site area; receive, via the user interface, selection of an indicator corresponding to a site location of the one or more site locations within the site area; based on the selection of the indicator, update the data to display on the user interface a selection interface within the user interface to allow user to modify data associated with the site location corresponding to the indicator; receive user input via the selection interface; and based on the user input, update the data to display an updated indicator corresponding to the site location.

In a 13th Example, the computer system of Example 12, wherein determining the relative position of each of the one or more site locations is further based on imagery captured by the one or more ground images.

In a 14th Example, the computer system of any of Examples 12-13, wherein the one or more hardware processors are further configured to execute the computer executable instructions in order to: receive, via the data interface, one or more second ground images of the site locations within the site area; update the data to display on the user interface: a first image of the one or more ground images corresponding to a first site location; a first image of the second one or more ground images corresponding to the first site location; and an indication that the first image of the second one or more ground images represents updated imagery of the first site location relative to the first image of the one or more ground images.

In a 15th Example, the computer system of any of Examples 12-14, wherein the one or more hardware processors are further configured to execute the computer executable instructions in order to: receive, via the user interface, user selection of an export selector; in response to the user selection of the export selector, transmit to a remote computing device a report comprising: the map of at least the site area; the indication of the at least the portion of the site area within the map; and an indicator corresponding to each of the one or more site locations within the site area; the updated indicator corresponding to one of the one or more site locations; and the user input associated with the updated indicator.

In a 16th Example, the computer system of any of Examples 12-15, wherein the one or more hardware processors are further configured to execute the computer executable instructions in order to: determine a first status of completion associated with a first set of the one or more site locations; determine a second status of completion associated with a second set of the one or more site locations; and update the data to display first status indicators corresponding to the first set and to display second status indicators corresponding to the second set.

In a 17th Example, the computer system of Example 16, wherein the one or more hardware processors are further configured to execute the computer executable instructions in order to: receiving, within the user interface, user selection of a selector corresponding to the first set; and displaying the first status indicators without displaying the second status indicators.

In a 18th Example, the computer system of any of Examples 12-17, wherein receiving metadata associated with each of the one or more ground images comprises receiving the GPS coordinates from a mobile device associated with the mobile device at around a time the ground images are obtained.

In a 19th Example, the computer system of any of Examples 12-18, wherein determining the relative position of each of the one or more site locations within the aerial imagery is based at least in part on a location associated with a mobile device when the ground images are obtained or a time associated with when the ground images are obtained.

In a 20th Example, the computer system of any of Examples 12-19, wherein determining the relative position of each of the one or more site locations within the aerial imagery is based on the one or more GPS coordinates.

In a 21st Example, the computer system of any of Examples 12-20, wherein the one or more hardware processors are further configured to execute the computer executable instructions in order to: receive, the user interface, user zoom input associated with the site area; based on the user zoom input, update the data to display an indication of a site sub-area within the site area, the site sub-area comprising at least one of the site locations.

In a 22nd Example, the computer system of any of Examples 12-21, wherein modifying the data associated with the site location corresponding to the indicator comprises at least one of: providing one or more dimensions associated with one or more site locations; tag the associated one or more site locations with the one or more dimensions; or calculating a total dimension associated with a sub-area comprising the one or more site locations.

In a 23rd Example, a computer-implemented method for generating an image of the aerial imagery, the method comprising: receiving, via a data interface, one or more ground images of site locations within a site area; identifying location information associated with corresponding locations of each of the one or more ground images; receiving image information associated with aerial imagery; determining, based on the location information, that aerial imagery includes the locations of each of the one or more ground images; receiving, via a user interface, selection of an indicator corresponding to a site location of the one or more site locations within the site area; generating the image of the aerial imagery of the site area and corresponding indications of each of the one or more site locations within the site area; receiving second one or more ground images and associated second location information associated with corresponding locations of each of the second one or more ground images; and generating corresponding indications of each of the second one or more site locations within the site area.

In a 24th Example, a computer-implemented method for generating an image of aerial imagery of the site area, the method comprising: receiving image data of one or more ground images of site locations within a site area and the aerial imagery of the site area, wherein the ground images each comprise metadata; determining, based on the metadata, locations of each of the one or more ground images within the site area; generating an image of the aerial imagery of the site area and corresponding indications of each of the locations of each of the one or more ground images within the site area; receiving a status of completion of one or more projects associated with each of the one or more site locations; and updating the data to display first status indicators corresponding to each of the one or more projects.

Additional Implementation Details

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

For example, FIG. 6 is a block diagram that illustrates a computer system 700 upon which various embodiments may be implemented. Computer system 700 includes a bus 702 or other communication mechanism for communicating information, and a hardware processor, or multiple processors, 704 coupled with bus 702 for processing information. Hardware processor(s) 704 may be, for example, one or more general purpose microprocessors.

Computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

Computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 700 may include a user interface module to implement a GUI that may be stored in a mass storage device as computer executable program instructions that are executed by the computing device(s). Computer system 700 may further, as described below, implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more computer readable program instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

Various forms of computer readable storage media may be involved in carrying one or more sequences of one or more computer readable program instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method for mapping a project site using ground and aerial imagery, the method comprising:
   receiving, via a data interface, one or more ground images of site locations within a site area;
   receiving, via the data interface, one or more location indications associated with each of the one or more ground images;
   determining that aerial imagery represents one or more site locations;
   determining a relative position of each of the one or more site locations within the aerial imagery;
   generating updated aerial imagery comprising:
      an aerial image of at least the site area;
      an indication of at least a portion of the site area within the aerial image; and
      a plurality of site markers corresponding to and indicating each of the one or more site locations within the site area, each of the plurality of site markers displayed within the aerial image;
   receiving, via a user interface, selection of a site marker corresponding to a site location of the one or more site locations within the site area;
   based on the selection of the site marker, displaying a selection interface within the user interface to allow a user to modify data associated with the site location corresponding to the site marker;
   receiving, within the selection interface, user input comprising updated one or more ground images of the site location;
   generating a report comprising:
      the updated aerial imagery;
      at least one of the updated one or more ground images; and
      a ground image of the one or more ground images associated with at least one site marker; and
   displaying the report on the user interface.

2. The computer-implemented method of claim 1, further comprising receiving a request to generate the report.

3. The computer-implemented method of claim 1, further comprising:
   receiving, via the user interface, a written detail associated with the site location;
   updating the report to further comprise the written detail; and
   displaying the updated report.

4. The computer-implemented method of claim 1, further comprising:
   receiving, via the user interface, a recipient indication, wherein the recipient indication indicates a location to which the report may be transmitted for receipt by a second user; and
   transmitting the report to the location.

5. The computer-implemented method of claim 4, further comprising:
   accessing information associated with the second user; and
   updating a portion of the report based on the information associated with the second user,
   wherein transmitting the report to the location comprises transmitting the updated report.

6. The computer-implemented method of claim 4, further comprising:
   altering the updated aerial imagery of the report based on information associated with the second user; and
   removing one or more portions of the report based on the information associated with the second user.

7. The computer-implemented method of claim 1, further comprising:
   receiving, via the user interface, a selected portion of the updated aerial imagery;
   altering the updated aerial imagery of the report based on the selected portion; and
   removing one or more portions of the report associated with locations outside of the selected portion.

8. The computer-implemented method of claim 1 wherein the report further comprises a status of completion associated with the at least one site marker.

9. The computer-implemented method of claim 1 wherein the report is generated based on receiving an indication that a status associated with the at least one site marker has been changed.

10. The computer-implemented method of claim 1 wherein at least one site area is associated with a proposal, wherein the proposal comprises proposed work to be performed in the at least one site area, and wherein the report further comprises the proposal.

11. The computer-implemented method of claim 1, further comprising receiving a bid associated with at least a portion of the site area, and wherein the report further comprises the bid.

12. The computer-implemented method of claim 1, wherein determining the relative position of each of the one or more site locations within the aerial imagery is based at least in part on a location associated with a mobile device when the one or more ground images are obtained or a time associated with when the one or more ground images are obtained.

13. The computer-implemented method of claim 1, wherein each of the one or more location indications comprises metadata, and wherein the metadata comprises corresponding GPS coordinates for a second ground image of the one or more ground images.

14. The computer-implemented method of claim 13, wherein determining the relative position of each of the one or more site locations within the aerial imagery is based on the corresponding GPS coordinates.

15. A computer-implemented method for generating reports based in part on aerial imagery of a site area, the method comprising:
   receiving image data of one or more ground images of site locations within the site area and the aerial imagery of the site area, wherein the one or more ground images each comprise metadata;
   determining, based on the metadata, locations of each of the one or more ground images within the site area;
   generating an image of the aerial imagery of the site area and corresponding site markers of each of the locations of each of the one or more ground images within the site area, each of the one or more ground images corresponding to one or more site locations;
   receiving, via a user interface, selection of a site marker corresponding to a site location of the one or more site locations within the site area;
   based on the selection of the site marker, displaying a selection interface within the user interface to allow a user to modify data associated with the site location corresponding to the site marker;
   receiving, within the selection interface, user input comprising updated one or more ground images of the site location;

generating a report comprising:
  the image;
  the one or more ground images of the site locations within the site area;
  at least one of the updated one or more ground images; and
  a label identifying each of the site locations based in part on the determined locations of the one or more ground images within the site area; and displaying the report on the user interface.

* * * * *